(12) United States Patent
Wu et al.

(10) Patent No.: US 12,021,636 B2
(45) Date of Patent: Jun. 25, 2024

(54) METHOD FOR DETERMINING HARQ CODEBOOK, TERMINAL APPARATUS, AND NETWORK APPARATUS

(71) Applicant: GUANGDONG OPPO MOBILE TELECOMMUNICATIONS CORP., LTD., Guangdong (CN)

(72) Inventors: Zuomin Wu, Guangdong (CN); Yanan Lin, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 418 days.

(21) Appl. No.: 17/461,524

(22) Filed: Aug. 30, 2021

(65) Prior Publication Data

US 2021/0391960 A1    Dec. 16, 2021

Related U.S. Application Data

(63) Continuation of application No. PCT/CN2019/085384, filed on Apr. 30, 2019.

(51) Int. Cl.
*H04L 1/18* (2023.01)
*H04L 1/1812* (2023.01)
*H04L 1/1867* (2023.01)
*H04W 72/04* (2023.01)
(Continued)

(52) U.S. Cl.
CPC .......... *H04L 1/1819* (2013.01); *H04L 1/1896* (2013.01); *H04W 72/0446* (2013.01); *H04W 72/21* (2023.01)

(58) Field of Classification Search
CPC .... H04L 1/1819; H04L 1/1896; H04W 72/21; H04W 72/0446
See application file for complete search history.

(56) References Cited

U.S. PATENT DOCUMENTS 10,999,864 B2 * 5/2021 Zhang ................... H04W 72/23
11,469,857 B2 * 10/2022 Zhou ..................... H04L 1/1812
11,470,676 B2 * 10/2022 Chen ...................... H04W 4/06
(Continued)

FOREIGN PATENT DOCUMENTS

CN    108023719 A    5/2018
CN    109600212 A    4/2019
(Continued)

OTHER PUBLICATIONS

Notice of Reasons for Refusal for Japanese application No. 2021-561856 issued Aug. 23, 2022. 11 pages with English translation.
(Continued)

*Primary Examiner* — Bailor C Hsu
(74) *Attorney, Agent, or Firm* — Perkins Coie LLP

(57) ABSTRACT

Provided in implementations of the present invention are a method for determining a HARQ codebook, a terminal apparatus, and a network apparatus. The method for determining a HARQ codebook includes: a terminal apparatus determining a first channel group, wherein HARQ time sequence indication information corresponding to first channels in the first channel group indicates a first uplink resource; and the terminal apparatus determining, for the first uplink resource, a first HARQ codebook corresponding to the first channel group.

19 Claims, 4 Drawing Sheets

200

A terminal device determines a first channel group, wherein HARQ timing indication information corresponding to a first channel in the first channel group indicates a first uplink resource ~ S210

The terminal device determines, for the first uplink resource, a first HARQ codebook corresponding to the first channel group ~ S220

(51) Int. Cl.
*H04W 72/0446* (2023.01)
*H04W 72/21* (2023.01)

(56) References Cited

U.S. PATENT DOCUMENTS

| | | | |
|---|---|---|---|
| 11,563,545 B2* | 1/2023 | Li | H04L 5/001 |
| 2017/0006491 A1 | 1/2017 | Chen et al. | |
| 2017/0134140 A1* | 5/2017 | Park | H04B 7/0413 |
| 2017/0273056 A1* | 9/2017 | Papasakellariou | H04W 52/146 |
| 2019/0103943 A1* | 4/2019 | Wang | H04L 1/1854 |
| 2019/0149271 A1* | 5/2019 | Yin | H04L 1/1607 |
| | | | 370/329 |
| 2019/0306841 A1* | 10/2019 | Huang | H04L 5/0055 |
| 2020/0044791 A1* | 2/2020 | Tsai | H04L 1/1854 |
| 2021/0006356 A1* | 1/2021 | Khoshnevisan | H04L 1/1864 |
| 2021/0050950 A1* | 2/2021 | Zhou | H04W 76/14 |
| 2021/0058945 A1* | 2/2021 | Zhang | H04L 1/1822 |
| 2022/0248436 A1* | 8/2022 | Zhang | H04W 72/1273 |
| 2022/0393801 A1* | 12/2022 | Lei | H04L 1/1812 |

FOREIGN PATENT DOCUMENTS

| | | |
|---|---|---|
| EP | 3873015 A1 | 9/2021 |
| WO | 2017085122 A1 | 5/2017 |

OTHER PUBLICATIONS

Samsung "HARQ enhancements for NR-U" R1-1904408; 3GPP TSG RAN WG1 #96bis; Xi'an, China; Apr. 8-12, 2019. 9 pages.
Ad-Hoc Chair (Ericsson) "Chairman's notes of AI 7.2.2 Study on NR-based Access to Unlicensed Spectrum" Tdoc R1-1905801; 3GPP TSG-RAN WG1 Meeting #96bis; Xi'an, China; Apr. 8-12, 2019. 10 pages.
Extended European Search Report for European Application No. 19927336.8 issued Jan. 28, 2022. 13 pages.
MediaTek Inc. "Enhancements to HARQ for NR-U operation" R1-1901800; 3GPP TSG RAN WG1 #96; Athens, Greece; Feb. 25-Mar. 1, 2019. 13 pages.
Nokia et al. On UCI Enhancements for NR URLLC R1-1904828; 3GPP TSG-RAN WG1 Meeting #96bis; Xi'an, China; Apr. 8-12, 2019. 11 pages.
Oppo "HARQ enhancements for NR-U" R1-1904896; 3GPP TSG-RAN WG1 Meeting #96bis; Xi'an, China; Apr. 8-12, 2019. 5 pages.
3GPP TSG RAN WG1 Meeting #96bis—R1-1905649—Xi'an, China, Apr. 8-12, 2019—Huawei, Feature lead summary of HARQ enhancements for NR-U (29 pages).
International Search Report issued Jan. 3, 2020 of PCT/CN2019/085384 (4 pages).
First Office Action for Chinese Application No. 202111096653.0 issued Nov. 18, 2022. 17 pages.
Decision of Rejection of the Chinese application No. 202111096653.0, issued on May 31, 2023. 15 pages with English translation.
Second examination report for European Application No. 19927336.8 issued Aug. 22, 2023. 6 pages.
Chinese Office Action mailed Mar. 3, 2023 in App. 202111096653.0 with English translation, 14 pages.
EP Examination Report mailed Feb. 28, 2023 in App. 19927336.8, 8 pages.

\* cited by examiner

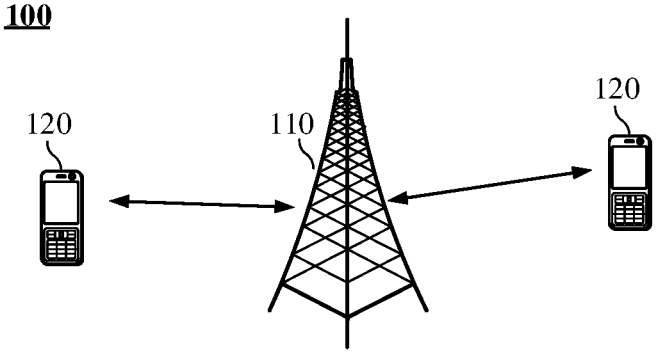
FIG. 1
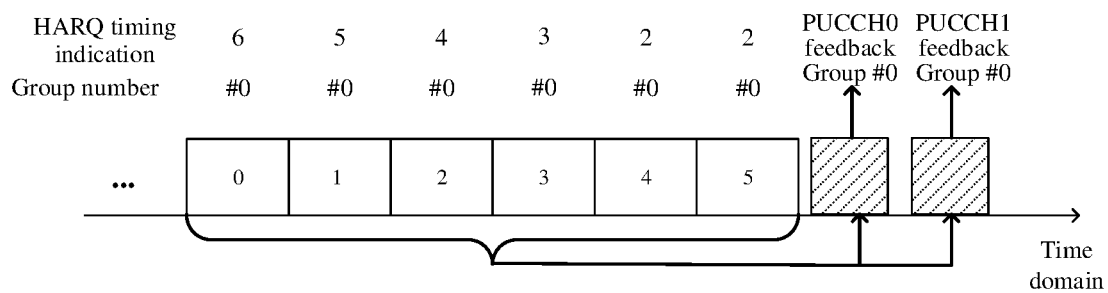
FIG. 2
FIG. 3

METHOD FOR DETERMINING HARQ CODEBOOK, TERMINAL APPARATUS, AND NETWORK APPARATUS

CROSS-REFERENCE TO RELATED APPLICATION

This application is a continuation application of International PCT Application No. PCT/CN2019/085384 filed on Apr. 30, 2019, the entire content of which is hereby incorporated by reference.

TECHNICAL FIELD

Implementations of the present disclosure relate to the field of communication, and more specifically, to a method for determining an HARQ codebook, a terminal device and a network device.

BACKGROUND

When a New Radio (NR) system is applied to an unlicensed frequency band, it may support independent network deployment, that is, it provides auxiliary services without relying on a carrier on a licensed frequency band. After receiving a physical downlink shared channel (PDSCH) on the unlicensed carrier, a terminal device needs to send hybrid automatic repeat request acknowledgement (HARQ-ACK) feedback corresponding to the PDSCH on the unlicensed carrier. Meanwhile, in the NR system, a network device may group scheduled PDSCHs. However, after receiving a grouped PDSCH, how to perform corresponding HARQ-ACK feedback according to different groups by the terminal device is a technical problem to be solved urgently.

SUMMARY

Implementations of the present disclosure provide a method for determining an HARQ codebook, a terminal device and a network device.

In a first aspect, there is provided a method for determining an HARQ codebook, including:
  determining, by a terminal device, a first channel group, wherein HARQ timing indication information corresponding to a first channel in the first channel group indicates a first uplink resource; and
  determining, by the terminal device, a first HARQ codebook corresponding to the first channel group for the first uplink resource.

In a second aspect, there is provided a method for receiving an HARQ codebook, including:
  sending, by a network device a first channel group, wherein HARQ timing indication information corresponding to a first channel in the first channel group indicates a first uplink resource; and
  receiving, by the network device, the first HARQ codebook corresponding to the first channel group on the first uplink resource.

In a third aspect, there is provided a terminal device configured to perform the method according to the first aspect described above or any of various implementations thereof.

Specifically, the terminal device includes function modules configured to perform the method according to the first aspect described above or any of various implementations thereof.

In a fourth aspect, there is provided a network device configured to perform the method according to the second aspect described above or any of various implementations thereof.

Specifically, the network device includes functional modules configured to perform the method according to the second aspect described above or any of various implementations thereof.

In a fifth aspect, there is provided a terminal device including a processor and a memory. The memory is configured to store a computer program, and the processor is configured to call and run the computer program stored in the memory to perform the method according to the first aspect described above or any of various implementations thereof.

In a sixth aspect, there is provided a network device including a processor and a memory. The memory is configured to store a computer program, and the processor is configured to call and run the computer program stored in the memory to perform the method according to the second aspect described above or any of various implementations thereof.

In a seventh aspect, there is provided an apparatus configured to implement the method according to any one of the first and second aspects described above or any of various implementations thereof.

Specifically, the apparatus includes a processor configured to call and run a computer program from a memory to enable a device in which the apparatus is installed to perform the method in any one of the above first and second aspects or various implementation modes thereof.

In an eighth aspect, there is provided a computer readable storage medium configured to store a computer program that enables a computer to perform the method according to any one of the first and second aspects described above or any of various implementations thereof.

In a ninth aspect, a computer program product is provided, including computer program instructions that enable a computer to perform the method in any one of the above first to second aspects or various implementation thereof.

In a tenth aspect, there is provided a computer program, which, when running on a computer, enable the computer to perform the method according to any one of the first and third aspects described above or any of various implementations thereof.

BRIEF DESCRIPTION OF DRAWINGS

FIG. 1 is a schematic diagram of an architecture of a communication system according to an implementation of the present disclosure.

FIG. 2 is a schematic flowchart of a method for determining an HARQ codebook according to an implementation of the present disclosure.

FIG. 3 is a schematic diagram of determining an HARQ codebook according to an implementation of the present disclosure.

DETAILED DESCRIPTION

Figure 4:
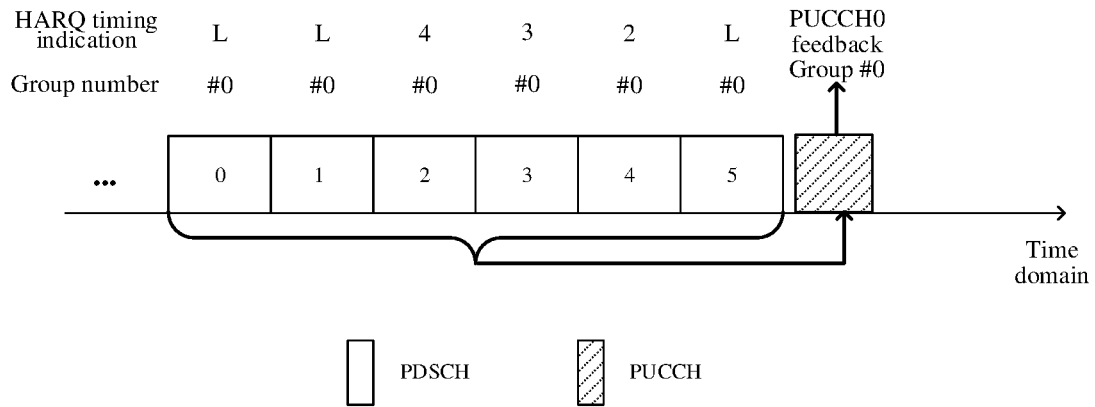
FIG. 4 is another schematic diagram of determining an HARQ codebook according to an implementation of the present disclosure.

Technical solutions in implementations of the present disclosure will be described below with reference to drawings in the implementations of the present disclosure. It is apparent that the implementations described are just some of the implementations of the present disclosure, but not all of the implementations of the present disclosure. According to the implementations of the present disclosure, all other implementations achieved by a person of ordinary skill in the art without paying an inventive effort are within the protection scope of the present disclosure.

The implementations of the present disclosure may be applied to various communication systems, such as a Global System of Mobile Communication (GSM) system, a Code Division Multiple Access (CDMA) system, a Wideband Code Division Multiple Access (WCDMA) system, a General Packet Radio Service (GPRS) system, a Long Term Evolution (LTE) system, an Advanced Long Term Evolution (LTE-A) system, a New Radio (NR) system, an evolution system of the NR system, an LTE-based access to unlicensed spectrum (LTE-U) system, an NR-based access to unlicensed spectrum (NR-U) system, a Universal Mobile Telecommunications System (UMTS), a Wireless Local Area Network (WLAN), Wireless Fidelity (WiFi), a next generation communication system or other communication systems.

Generally speaking, a conventional communication system supports a limited quantity of connections and is easy to implement. However, with the development of communication technology, a mobile communication system will not only support conventional communication, but also support, for example, device to device (D2D) communication, machine to machine (M2M) communication, machine type communication (MTC), vehicle to vehicle (V2V) communication, and the implementations of the present disclosure may also be applied to these communication systems.

Optionally, a communication system in an implementation of the present disclosure may be applied to a carrier aggregation (CA) scenario, a dual connectivity (DC) scenario, or a standalone (SA) scenario.

Implementations of the present disclosure do not limit applied frequency spectrums. For example, implementations of the present disclosure may be applied to both licensed spectrums and unlicensed spectrums.

Illustratively, a communication system 100 applied in an implementation of the present disclosure is shown in FIG. 1. The communication system 100 may include a network device 110, which may be a device that communicates with terminal devices 120 (or referred to as communication terminals, or terminals). The network device 110 may provide communication coverage for a specific geographical area, and may communicate with terminal devices located within the coverage area.

FIG. 1 exemplarily illustrates one network device and two terminal devices. Optionally, the communication system 100 may include multiple network devices, and other quantities of terminal devices may be included within the coverage range of each network device, which is not limited in the implementations of the present disclosure.

Optionally, the communication system 100 may include other network entities, such as a network controller and a mobile management entity, which are not limited in implementations of the present disclosure.

It should be understood that a device with a communication function in a network/system in an implementation of the present disclosure may be referred to as a communication device. Taking the communication system 100 shown in FIG. 1 as an example, the communication device may include a network device 110 and terminal devices 120 which have communication functions, wherein the network device 110 and the terminal devices 120 may be the specific devices described above, and will not be described repeatedly herein. The communication device may also include other another device in the communication system 100, for example other network entities, such as a network controller and a mobile management entity, which is not limited in the implementations of the present disclosure.

It should be understood that the terms "system" and "network" are often used interchangeably herein. The term "and/or" herein describes an association relation between associated objects only, indicating that there may be three relations, for example, A and/or B may indicate three cases: A alone, both A and B, and B alone. In addition, the symbol "/" herein generally indicates that there is a "or" relation between the associated objects before and after "/".

Implementations of the present disclosure describe various implementations in combination with a terminal device and a network device, wherein the terminal device may also be referred to as User Equipment (UE), an access terminal, a subscriber unit, a subscriber station, a mobile station, a rover platform, a remote station, a remote terminal, a mobile device, a user terminal, a terminal, a wireless communication device, a user agent or a user device, etc. The terminal device may be a STATION (ST) in WLAN, a cellular phone, a cordless phone, a Session Initiation Protocol (SIP) phone, a Wireless Local Loop (WLL) station, a Personal Digital Assistant (PDA) device, a handheld device with a wireless communication function, a computing device or other processing device connected to a wireless modem, a vehicle-mounted device, a wearable device, and a next generation communication system, such as a terminal device in an NR network, or a terminal device in a future evolving Public Land Mobile Network (PLMN), etc.

By way of example but not limitation, in an implementation of the present disclosure, the terminal device may also be a wearable device. A wearable device may also be referred to a wearable smart device, which is a general term of wearable devices developed by smart design of daily wear using wearing technology, e.g., glasses, gloves, watches, clothing, shoes, etc. A wearable device is a portable device that is worn directly on a body or integrated into clothes or accessories of a user. Wearable devices are not only a type of hardware devices, but also realize powerful functions through software support, data interaction and cloud interaction. Generalized wearable smart devices include complete or partial functions that are full functioned, large sized, and may be realized without relying on smart phones, such as smart watches or smart glasses, etc., and functions that are only focused on a certain kind of applications and need to be used in conjunction with other devices such as smart phones, such as various smart bracelets and smart jewelries for monitoring physical signs.

The network device may be a network device for communicating with a mobile device, or may be an Access Point (AP) in WLAN, or a Base Transceiver Station (BTS) in GSM or CDMA, or may be a NodeB (NB) in WCDMA, or an Evolutional Node B (eNB or eNodeB) in LTE, or a relay station or an access point, or a vehicle-mounted device, a wearable device, a network device (gNB) in an NR network, or a network device in a future evolved PLMN network.

In an implementation of the present disclosure, the network device provides a service for a cell, and the terminal device communicates with the network device through a transmission resource (e.g., a frequency domain resource or a spectrum resource) used by the cell, which may be a cell corresponding to the network device (e.g., a base station). The cell may belong to macro base station, or a base station corresponding to a Small cell. The small cell here may include: a Metro cell, a Micro cell, a Pico cell, a Femto cell, etc. These small cells have characteristics of small coverage range and low transmission power, and are suitable for providing high-speed data transmission services.

It should be understood that an unlicensed spectrum is a spectrum classified by countries and regions that is available to communication of radio devices. The spectrum is generally regarded as a shared spectrum, that is, communication devices in different communication systems may use the spectrum as long as they meet regulatory requirements configured by countries or regions on the spectrum, without applying for exclusive spectrum authority to a government.

In order to enable various communication systems using an unlicensed spectrum for wireless communication to coexist amicably on this spectrum, some countries or regions have stipulated the legal requirements that must be met for using an unlicensed spectrum. For example, the communication devices follow a "Listen Before Talk (LBT)" principle, that is, before transmitting signals on a channel of the unlicensed spectrum, a communication device needs to conduct channel sensing first, and the communication devices can transmit signals only when a result of the channel sensing is that the channel is idle. If the result of the channel sensing by the communication device on the unlicensed spectrum channel is that the channel is busy, the communication device cannot transmit signals. In order to ensure fairness, in one transmission, a duration of signal transmission by a communication device using the channel on the unlicensed spectrum may not exceed a Maximum Channel Occupancy Time (MCOT).

Unlike LTE systems, a NR system supports dynamic determination of HARQ feedback timing. A base station schedules the terminal device to receive a PDSCH through Downlink Control Information (DCI), wherein the DCI includes indication information of a Physical Uplink Control Channel (PUCCH) resource for transmitting HARQ-ACK corresponding to the PDSCH. Specifically, the indication information includes:

PUCCH resource indicator: used for determining the PUCCH resource;

HARQ timing indicator: used for dynamically determining a time domain position of the PUCCH resource. The HARQ timing indication information is used for determining values in a preconfigured HARQ timing set. For example, when the HARQ timing indication information is 000, k0 in the HARQ timing set is indicated, and when the HARQ timing indication information is 001, k1 in the HARQ timing set is indicated, and so on.

In case of dynamic codebook feedback, the DCI may further include the following information:

Downlink assignment index (DAI), including DAI count information and/or DAI total information, wherein the DAI count information is used for indicating which PDSCH in a current HARQ feedback window is currently scheduled, and the DAI total information is used for indicating how many PDSCHs are scheduled in total in the current HARQ feedback window.

According to the above information, the terminal device may determine a PUCCH resource for feeding back the HARQ-ACK and a position of the HARQ-ACK in a codebook transmitted on the PUCCH resource.

It should be understood that maximum channel occupancy time (MCOT) refers to a maximum time length allowed for signal transmission using a channel of an unlicensed spectrum after LBT succeeds, and there are different MCOTs under different channel access priorities. At present, the maximum value of MCOT is 10 ms. It should be understood that the MCOT is time occupied by the signal transmission.

Channel occupancy time (COT) refers to a time length of signal transmission using a channel of an unlicensed spectrum after LBT succeeds, wherein a channel occupied by a signal within the time length may be discontinuous. A maximum length of one COT cannot exceed 20 ms, and the time length occupied by signal transmission within the COT does not exceed the MCOT.

gNB-initiated COT, also called COT initiated by a base station, refers to time of one channel occupation obtained after successful LBT of the base station. In addition to downlink transmission, the gNB-initiated COT may also be used for uplink transmission by UE under a certain condition.

UE-initiated COT, also called COT initiated by a UE, refers to time of one channel occupation obtained after successful LBT of the UE.

Downlink burst (DL burst) refers to one group of downlink transmissions (i.e., including one or more downlink transmissions) performed by the base station, wherein the group of downlink transmissions are continuous transmissions (i.e., there are no gap between the multiple downlink transmissions), or the group of downlink transmissions have a gap therebetween but the gap is less than or equal to 16 μs. If a gap between two downlink transmissions performed by the base station is greater than 16 μs, it is considered that the two downlink transmissions belong to two DL bursts.

Uplink burst (UL burst) refers to one group of uplink transmissions (i.e., including one or more uplink transmissions) performed by one UE, wherein the group of uplink transmissions are continuous transmissions (i.e., there are no gap between the multiple uplink transmissions), or the group of uplink transmissions have a gap therebetween but the gap is less than or equal to 16 μs. If a gap between two uplink transmissions performed by the base station is greater than 16 μs, it is considered that the two uplink transmissions belong to two UL bursts.

It should be understood that when a NR system is applied to an unlicensed frequency band, it may support independent network deployment, that is, it provides auxiliary services without relying on carriers on the licensed frequency band. In this scenario, after receiving a PDSCH on an unlicensed carrier, the UE needs to send HARQ-ACK feedback corresponding to the PDSCH on the unlicensed carrier.

At present, in the unlicensed frequency band, the HARQ timing indication information may be used not only for determining a PUCCH time domain resource for transmitting the HARQ-ACK corresponding to the PDSCH, but also to indicate the state that the HARQ-ACK corresponding to the PDSCH will not be fed back first. For example, the preconfigured HARQ timing set includes a value $k_L$, indicating an invalid resource indication, and when the HARQ timing indication information is 111, $k_L$, in the HARQ timing set is indicated, indicating that the corresponding PUCCH resource cannot be determined temporarily.

In addition, in order to flexibly feed back the HARQ-ACK information corresponding to the PDSCH in the unlicensed frequency band, the base station may group the scheduled PDSCH, and indicate grouping information of the PDSCH by displaying signaling, so that the UE performs corresponding HARQ-ACK feedback according to different groups after receiving the PDSCH. If a certain group of HARQ-ACK information of the UE fails to be transmitted due to LBT failure during a certain transmission, or the base station fails to detect, on a certain PUCCH resource, a certain group of HARQ-ACK information expected to be transmitted by the UE, the base station may trigger the UE to retransmit this group of HARQ-ACK information through DCI. The UE may keep a same codebook size as the initial transmission when retransmitting a certain group of HARQ-ACK information, and may also add new HARQ-ACK information during the retransmission.

The UE needs to carry out HARQ-ACK feedback according to the grouping performed by the base station, while grouping rules of the base station are not limited. Therefore, for the UE, the HARQ timing indication information corresponding to PDSCHs included in a same group may indicate different PUCCH resources. When there is inconsistency, it is worth studying how to feedback HARQ-ACK by the UE.

In view of the above technical problem, an implementation of the present disclosure provides a method for determining an HARQ codebook. According to this method, when the HARQ timing indication information corresponding to PDSCHs in a same group corresponds to different PUCCH resources, an HARQ codebook corresponding to the group may be determined.

The following describes in detail a solution for determining an HARQ codebook in the present disclosure designed regarding the above technical problem.

FIG. 2 is a schematic flowchart of a method 200 for determining an HARQ codebook according to an implementation of the present disclosure. As shown in FIG. 2, the method 200 may include part or all of the following acts:

In S210, a terminal device determines a first channel group, wherein HARQ timing indication information corresponding to a first channel in the first channel group indicates a first uplink resource; and In S220, the terminal device determines, for the first uplink resource, a first HARQ codebook corresponding to the first channel group.

Optionally, the method 200 is applied to an unlicensed frequency band.

It should be understood that in implementations of the present disclosure, an HARQ codebook may also be called an HARQ-ACK codebook or HARQ information.

It should be noted that channels with a same channel group number belong to a same group. That is, the channels in the first channel group have a same channel group number. The channel group number may be indicated by a network device (e.g., a base station).

Optionally, channels with the same channel group number may transmit services with the same priority. For example, data channels including Ultra-Reliable and Low Latency Communication (URLLC) services belong to a same channel group. For another example, data channels including Enhance Mobile Broadband (eMBB) services belong to a same channel group.

Optionally, in an implementation of the present disclosure, the first channel is the channel being indicated the first uplink resource at the latest in the first channel group. For example, the first channel may be the last channel being indicated the first uplink resource. Or, after the first channel, the first channel group does not include a channel which is indicated the first uplink resource by the HARQ timing indication information.

Assuming that the first channel group is a PDSCH group, in an implementation of the present disclosure, the base station may transmit multiple PDSCHs to the terminal device in one downlink burst in the COT initiated by the base station. In order to enable the HARQ-ACK information corresponding to the multiple PDSCHs to be fed back to the base station as soon as possible, the base station may indicate the terminal device to feed back HARQ-ACK information corresponding to the downlink burst on an uplink resource after the downlink burst is ended. That is to say, the above acts S210 and S220 may be a specific solution about how the terminal device may perform HARQ-ACK feedback for the PDSCH received in the downlink burst after the downlink burst is ended.

It should be noted that if the uplink resource belongs to the COT initiated by the base station, and a gap between a start position of the uplink resource and an end position of the downlink burst is less than or equal to a preset value, such as 16 microseconds, the terminal device may directly feed back the HARQ-ACK information on the uplink resource with no need of performing LBT. However, for a PDSCH scheduled near the end position in the downlink burst, it is difficult for the terminal device to immediately perform corresponding HARQ-ACK feedback on the uplink resource due to the limitation of terminal processing capability.

Optionally, the first channel group includes at least one PDSCH.

Optionally, the first uplink resource may be a PUCCH resource or a Physical Uplink Shared Channel (PUSCH) resource.

Optionally, in an implementation of the present disclosure, a size of the first HARQ codebook is determined according to the number of channels in the first channel group. For example, the size of the first HARQ codebook is determined according to the number of PDSCHs in the first PDSCH group.

Optionally, in an implementation of the present disclosure, the first HARQ codebook includes HARQ codebooks corresponding to channels in the first channel group.

Optionally, in an implementation of the present disclosure, the first HARQ codebook includes the HARQ codebook corresponding to a channel of the first uplink resource indicated by the corresponding HARQ timing indication information in the first channel group.

For example, if the first channel group includes channels 1 to 6, and HARQ timing indication information corresponding to at least one channel in the first channel group indicates the first uplink resource, then the first HARQ codebook includes HARQ codebooks corresponding to the channels 1 to 6.

For another example, if the first channel group includes channels 1 to 6, HARQ timing indication information corresponding to channels 1 to 5 in the first channel group indicates the first uplink resource and HARQ timing indication information corresponding to channel 6 in the first channel group indicates a second uplink resource, then the first HARQ codebook only includes HARQ codebooks corresponding to the channels 1 to 5.

Optionally, in an implementation of the present disclosure, HARQ timing indication information corresponding to a second channel in the first channel group indicates no feedback temporarily, the second channel is no later than the first channel in time domain, and the first HARQ codebook includes an HARQ codebook corresponding to the second channel.

It should be noted that the second channel may be a channel being indicated with invalid HARQ timing in the front or middle of the first channel group in time domain. Or, HARQ timing indication information corresponding to at least one channel included in the first channel group after the second channel indicates the first uplink resource.

It should be understood that the HARQ timing indication information indicates no feedback temporarily, which means that the HARQ timing indication information is an invalid HARQ timing.

For example, it is assumed that the first channel group includes channels 1 to 6, and HARQ timing indication information corresponding to channels 1, 2 and 5 indicates no feedback temporarily, while HARQ timing indication information corresponding to channels 3, 4 and 6 indicates the first uplink resource, since channels 1 and 2 are no later than channels 3, 4 and 6 in time domain, and channel 5 is no later than channel 6 in time domain, then the first HARQ codebook includes HARQ codebooks corresponding to the channels 1 to 6.

Optionally, in an implementation of the present disclosure, if the HARQ timing indication information corresponding to the third channel in the first channel group indicates no feedback temporarily, the third channel is later than the first channel in time domain, then the first HARQ codebook includes one of the following cases:
  a HARQ codebook corresponding to the third channel in the first HARQ codebook is set as Negative Acknowledgement (NACK) or placeholder information; and
  the first HARQ codebook does not include the HARQ codebook corresponding to the third channel.

It should be noted that the third channel is the last channel being indicated with invalid HARQ timing in the first channel group in time domain. Or, after the third channel, the first channel group does not include a channel being indicated the first uplink resource by the HARQ timing indication information.

For example, it is assumed that the first channel group includes channels 1 to 6, and HARQ timing indication information corresponding to channels 1, 2 and 6 indicates no feedback temporarily, while HARQ timing indication information corresponding to channels 3, 4 and 5 indicates the first uplink resource, since channels 1 and 2 are no later than channels 3, 4 and 5 in time domain, and channel 6 is later than channels 3, 4 and 5 in the time domain, then the first HARQ codebook includes HARQ codebooks corresponding to channels 1 to 5, and the HARQ codebook corresponding to channel 6 in the first HARQ codebook is set as NACK or placeholder information, or the first HARQ codebook does not include the HARQ codebook corresponding to channel 6.

Optionally, the placeholder information is NACK information.

Optionally, the placeholder information is not information with specific meanings such as NACK information, and a position corresponding to the placeholder information cannot normally store the codebook. For example, it may be understood as blank, that is, it is not used for storing codebook information.

Optionally, in an implementation of the present disclosure, HARQ timing indication information corresponding to the fourth channel in the first channel group indicates a second uplink resource, and the terminal device determines a second HARQ codebook corresponding to the first channel group for the second uplink resource.

Optionally, the second uplink resource and the first uplink resource have different positions in the time domain.

Optionally, the fourth channel may be the last channel being indicated the second uplink resource in the first channel group in the time domain. Or, after the fourth channel, the first channel group does not include a channel being indicated the second uplink resource by the HARQ timing indication information.

Specifically, the second HARQ codebook includes an HARQ codebook corresponding to a channel of the second uplink resource indicated by the corresponding HARQ timing indication information in the first channel group.

Optionally, the second HARQ codebook includes one of the following cases:
  the second HARQ codebook includes an HARQ codebook corresponding to the first channel;
  the HARQ codebook corresponding to the first channel in the second HARQ codebook is set as NACK or placeholder information.

Optionally, in an implementation of the application,
  if the second uplink resource is no later than the first uplink resource in the time domain, the HARQ codebook corresponding to the first channel in the second HARQ codebook is set as NACK or placeholder information; and/or,
  if the second uplink resource is later than the first uplink resource in the time domain, the second HARQ codebook includes the HARQ codebook corresponding to the first channel.

Optionally, the HARQ timing indication information corresponding to the second channel in the first channel group indicates no feedback temporarily, the second channel is no later than the fourth channel in the time domain, and the second HARQ codebook includes the HARQ codebook corresponding to the second channel.

Optionally, the HARQ timing indication information corresponding to the third channel in the first channel group indicates no feedback temporarily, the third channel is later than the fourth channel in time domain, and the second HARQ codebook includes one of the following cases:
  an HARQ codebook corresponding to the third channel in the second HARQ codebook is set as NACK or placeholder information;
  the second HARQ codebook does not include the HARQ codebook corresponding to the third channel.

Optionally, if HARQ timing indication information corresponding to the fourth channel in the first channel group indicates the second uplink resource, the terminal device ignores determining the HARQ codebook corresponding to the first channel group for the second uplink resource, wherein the fourth channel is no later than the first channel in the time domain Optionally, the first HARQ codebook includes the HARQ codebook corresponding to the fourth channel.

Optionally, if the HARQ timing indication information corresponding to the fourth channel in the first channel group indicates the second uplink resource, the terminal device ignores determining the HARQ codebook corresponding to the first channel group for the second uplink resource, wherein the fourth channel is later than the first channel in the time domain. Optionally, the first HARQ codebook includes the HARQ codebook corresponding to the fourth channel.

That is to say, for the same channel group, the terminal device does not expect to receive the channels corresponding to two or more uplink resources with different time domain positions indicated by valid HARQ timing indication information. If the terminal device receives the channels corresponding to two or more uplink resources with different time domain positions indicated by the valid HARQ timing indication information, the terminal device selects one uplink resource from two or more uplink resources with different time domain positions to perform feedback of HARQ codebook. For example, the terminal device selects the first or the last uplink resource of the two or more uplink resources according to a protocol agreement or a configuration of the network to perform feedback of HARQ codebook.

The above method for determining an HARQ codebook is described in detail by four implementations below.

Optionally, as the first implementation, when grouping PDSCHs, the base station divides a PDSCH which cannot feedback in time due to limitation of its processing capacity and a PDSCH which can feedback normally into a group, and indicates one PUCCH for the PDSCH which can be fed back normally and another PUCCH for the PDSCH which cannot be fed back in time. As shown in FIG. 3, the base station schedules 6 PDSCH for the terminal device in one downlink burst, which are respectively named as PDSCH 0 to PDSCH 5. The 6 PDSCHs belong to a same group, i.e., group #0. A feedback resource indicated by HARQ timing indication information corresponding to PDSCH 0 to PDSCH 4 among the 6 PDSCHs is PUCCH 0. For PDSCH 5, due to the limitation of processing capacity, the terminal device has no time to feed back the HARQ codebook corresponding to PDSCH 5 on PUCCH 0, and the base station indicates to the terminal device that a feedback resource indicated by HARQ timing indication information corresponding to PDSCH 5 is PUCCH 1 after PUCCH 0. HARQ codebooks transmitted on PUCCH 0 and PUCCH 1 both include HARQ-ACK information corresponding to PDSCHs in group #0.

It should be noted that the terminal device determines that the feedback resource is PUCCH 0 or PUCCH 1 according to the HARQ timing indication information. As shown in FIG. 3, in group #0, HARQ timing indication information corresponding to PDSCH 0 is 6, that is, a distance between PDSCH 0 and PUCCH 0 in the time domain may be considered as 6 time units, such as 6 time slots. HARQ timing indication information corresponding to PDSCH 1 is 5, that is, the distance between PDSCH 1 and PUCCH 0 in the time domain may be considered as 5 time units, such as 5 time slots. HARQ timing indication information corresponding to PDSCH 2 is 4, that is, a distance between PDSCH 2 and PUCCH 0 in the time domain may be considered as 4 time units, such as 4 time slots. HARQ timing indication information corresponding to PDSCH 3 is 3, that is, a distance between PDSCH 3 and PUCCH 0 in the time domain may be considered as 3 time units, such as 3 time slots. HARQ timing indication information corresponding to PDSCH 4 is 2, that is, a distance between PDSCH 4 and PUCCH 0 in time domain may be considered as 2 time units, such as 2 time slots. HARQ timing indication information corresponding to PDSCH 5 is 2, that is, a distance between PDSCH 5 and PUCCH 1 in time domain may be considered as 2 time units, such as 2 time slots.

Taking the HARQ codebook of one PDSCH corresponding to two codewords as an example, the HARQ codebook corresponding to the PDSCHs in group #0 included in the HARQ codebook transmitted on PUCCH 0 may include one of the following cases 1 and 2.

In case 1, for a PDSCH in group #0 whose feedback resource indicated by the HARQ timing indication information is not PUCCH 0, that is, PDSCH 5, its corresponding HARQ codebook is set as NACK or placeholder information, that is, the HARQ codebook transmitted on PUCCH 0 is as shown in Table 1 below. The terminal device may determine the size of the HARQ codebook according to the number of PDSCHs included in the group #0 before PUCCH 0 when preparing the codebook corresponding to the PDSCHs in the group #0 for PUCCH 0, thus avoiding misunderstanding and ambiguity between the base station and the terminal device.

TABLE 1

| HARQ codebook corresponding to PUCCH 0 | | | | | |
| --- | --- | --- | --- | --- | --- |
| PDSCH 0 | | PDSCH 1 | | PDSCH 2 | |
| Codeword 0 | Codeword 1 | Codeword 0 | Codeword 1 | Codeword 0 | Codeword 1 |
| PDSCH 3 | | PDSCH 4 | | PDSCH 5 | |
| Codeword 0 | Codeword 1 | Codeword 0 | Codeword 1 | NACK | NACK |

In case 2, for a PDSCH in group #0 whose feedback resource indicated by the HARQ timing indication information is not PUCCH 0, if the PDSCH(s) are the last or last consecutive PDSCHs in this burst, the HARQ codebook in group #0 does not include the HARQ codebook corresponding to these PDSCHs, that is, the HARQ codebook transmitted on PUCCH 0 is as shown in Table 2 below. When preparing the HARQ codebook corresponding to the PDSCHs in group #0 for PUCCH 0, the terminal device determines the size of the HARQ codebook according to the number of PDSCHs included in group #0 before the last PDSCH being indicated PUCCH 0, which can reduce the bit number of the HARQ codebook fed back on PUCCH 0.

TABLE 2

| HARQ codebook corresponding to PUCCH 0 | | | | | |
| --- | --- | --- | --- | --- | --- |
| PDSCH 0 | | PDSCH 1 | | PDSCH 2 | |
| Codeword 0 | Codeword 1 | Codeword 0 | Codeword 1 | Codeword 0 | Codeword 1 |
| PDSCH 3 | | PDSCH 4 | | | |
| Codeword 0 | Codeword 1 | Codeword 0 | Codeword 1 | | |

Taking the HARQ codebook of one PDSCH corresponding to two codewords as an example, the HARQ codebook corresponding to the PDSCHs in group #0 included in the HARQ codebook transmitted on PUCCH 1 may include at least one of the following cases 3 and 4.

In case 3, for PDSCHs in group #0 whose feedback resource indicated by the HARQ timing indication information is not PUCCH 1, the HARQ codebook corresponding to these PDSCHs is set as NACK or placeholder information, that is, the HARQ codebook transmitted on PUCCH 1 is as shown in Table 3 below. Or, if the terminal device can transmit PUCCH 0 without LBT, the terminal device does not need to feed back the HARQ codebook corresponding to PUCCH 0 through PUCCH 1.

TABLE 3

| HARQ codebook corresponding to PUCCH 1 | | | | | |
|---|---|---|---|---|---|
| PDSCH 0 | | PDSCH 1 | | PDSCH 2 | |
| NACK | NACK | NACK | NACK | NACK | NACK |
| PDSCH 3 | | PDSCH 4 | | PDSCH 5 | |
| NACK | NACK | NACK | NACK | Codeword 0 | Codeword 1 |

In case 4, for PDSCHs in group #0 whose feedback resource indicated by the HARQ timing indication information is not PUCCH 1, if at least one PDSCH with the feedback resource indicated as PUCCH 1 is included after these PDSCHs and before PUCCH 1, the HARQ codebook corresponding to PUCCH 1 includes the HARQ-ACK codebook corresponding to these PDSCHs, that is, the HARQ codebook transmitted on PUCCH 1 is as shown in Table 4 below. If the terminal device fails in LBT before the time unit where PUCCH 0 is located, the terminal device also has a burst to feed back the HARQ codebook corresponding to PUCCH 0 through PUCCH 1 in the manner of case 4, thus increasing the bursts for transmitting HARQ codebook on PUCCH 0.

TABLE 4

| HARQ codebook corresponding to PUCCH 1 | | | | | |
|---|---|---|---|---|---|
| PDSCH 0 | | PDSCH 1 | | PDSCH 2 | |
| Codeword 0 | Codeword 1 | Codeword 0 | Codeword 1 | Codeword 0 | Codeword 1 |
| PDSCH 3 | | PDSCH 4 | | PDSCH 5 | |
| Codeword 0 | Codeword 1 | Codeword 0 | Codeword 1 | Codeword 0 | Codeword 1 |

Optionally, as the second implementation,

When grouping PDSCHs, the base station divides a PDSCH which cannot determine a feedback resource temporarily and a PDSCH which can feed back normally into one group, and does not indicate a new PUCCH resource for the PDSCH which cannot feed back temporarily. As shown in FIG. 4, the base station schedules 6 PDSCHs for the terminal device in one downlink burst, which are respectively named PDSCH 0 to PDSCH 5. The 6 PDSCHs belong to a same group, i.e., group #0. A feedback resource indicated by HARQ timing indication information corresponding to PDSCH 2, PDSCH 3 and PDSCH 4 among the 6 PDSCHs is PUCCH 0. With respect to PDSCH 0, PDSCH 1 and PDSCH 5, the base station indicates that the feedback resource indicated by HARQ timing indication information corresponding to PDSCH 0, PDSCH 1 and PDSCH 5 of the terminal device is temporarily undetermined. An HARQ codebook transmitted on PUCCH 0 includes an HARQ codebook corresponding to the PDSCHs in group #0.

That is, in the second implementation, the PDSCHs in one group correspond to one valid PUCCH resource.

It should be noted that the terminal device determines that the feedback resource is PUCCH 0 according to the HARQ timing indication information. As shown in FIG. 4, in group #0, HARQ timing indication information corresponding to PDSCH 0 is L, that is, a feedback resource indicated by the HARQ timing indication information corresponding to PDSCH 0 may be considered as being temporarily undetermined. HARQ timing indication information corresponding to PDSCH 1 is L, that is, a feedback resource indicated by the HARQ timing indication information corresponding to PDSCH 1 may be considered as being temporarily undetermined. HARQ timing indication information corresponding to PDSCH 2 is 4, that is, a distance between PDSCH 2 and PUCCH 0 in the time domain may be considered as 4 time units, such as 4 time slots. HARQ timing indication information corresponding to PDSCH 3 is 3, that is, a distance between PDSCH 3 and PUCCH 0 in the time domain may be considered as 3 time units, such as 3 time slots. HARQ timing indication information corresponding to PDSCH 4 is 2, that is, a distance between PDSCH 4 and PUCCH 0 in the time domain may be considered as 2 time units, such as 2 time slots. HARQ timing indication information corresponding to PDSCH 5 is L, that is, a feedback resource indicated by the HARQ timing indication information corresponding to PDSCH 5 may be considered as being temporarily undetermined.

The HARQ codebook corresponding to the PDSCHs in group #0 included in the HARQ codebook transmitted on PUCCH 0 may include at least one of the following cases 5, 6 and 7.

In case 5, for PDSCH in group #0 whose feedback resource indicated by the HARQ timing indication information is temporarily undetermined, its corresponding HARQ codebook is set as NACK or placeholder information, that is, the HARQ codebook transmitted on PUCCH 0 is as shown in Table 5 below. When preparing the HARQ codebook corresponding to the PDSCHs in group #0 for PUCCH 0, the terminal device determines the size of the HARQ codebook according to the number of PDSCHs included in group #0 before PUCCH 0, which can avoid the misunderstanding and ambiguity between the base station and the terminal device. In addition, valid HARQ timing indication information and invalid HARQ timing indication information (HARQ timing indication information which indicates a temporarily undetermined feedback resource) are fed back in groups to avoid the misunderstanding and ambiguity when they belong to the same group but the HARQ timing indicates different uplink feedback resources.

TABLE 5

| HARQ codebook corresponding to PUCCH 0 | | | | | |
|---|---|---|---|---|---|
| PDSCH 0 | | PDSCH 1 | | PDSCH 2 | |
| NACK | NACK | NACK | NACK | Codeword 0 | Codeword 1 |
| PDSCH 3 | | PDSCH 4 | | PDSCH 5 | |
| Codeword 0 | Codeword 1 | Codeword 0 | Codeword 1 | NACK | NACK |

In case 6, for PDSCHs in group #0 whose feedback resource indicated by the HARQ timing indication information is temporarily undetermined, if at least one PDSCH with the feedback resource indicated as PUCCH 0 is included after these PDSCHs and before PUCCH 0, the HARQ codebook corresponding to PUCCH 0 includes the HARQ-ACK codebook corresponding to these PDSCHs. If the PDSCH(s) are the last or last consecutive PDSCHs in this burst, the HARQ-ACK codebook corresponding to these PDSCHs is set as NACK or placeholder information, that is, the HARQ codebook transmitted on PUCCH 0 is as shown in Table 6 below. In case 6, for a PDSCH whose HARQ timing indication information indicates no feedback temporarily, its uplink feedback resource may be determined according to a valid uplink feedback resource indicated by another PDSCH in the same group.

TABLE 6

| HARQ codebook corresponding to PUCCH 0 | | | | | |
|---|---|---|---|---|---|
| PDSCH 0 | | PDSCH 1 | | PDSCH 2 | |
| Codeword 0 | Codeword 1 | Codeword 0 | Codeword 1 | Codeword 0 | Codeword 1 |
| PDSCH 3 | | PDSCH 4 | | PDSCH 5 | |
| Codeword 0 | Codeword 1 | Codeword 0 | Codeword 1 | NACK | NACK |

In case 7, for a PDSCH in group #0 whose feedback resource indicated by the HARQ timing indication information is temporarily undetermined, if at least one PDSCH with the feedback resource indicated as PUCCH 0 is included after these PDSCHs and before PUCCH 0, the HARQ codebook corresponding to PUCCH 0 includes the HARQ codebook corresponding to these PDSCH. If the PDSCH(s) are the last or last consecutive PDSCHs in this burst, the codebook in group #0 does not include the HARQ-ACK codebook corresponding to these PDSCHs, that is, the HARQ codebook transmitted on PUCCH 0 is as shown in Table 7 below.

TABLE 7

| HARQ codebook corresponding to PUCCH 0 | | | | | |
|---|---|---|---|---|---|
| PDSCH 0 | | PDSCH 1 | | PDSCH 2 | |
| Codeword 0 | Codeword 1 | Codeword 0 | Codeword 1 | Codeword 0 | Codeword 1 |
| PDSCH 3 | | PDSCH 4 | | | |
| Codeword 0 | Codeword 1 | Codeword 0 | Codeword 1 | | |

Figure 5:
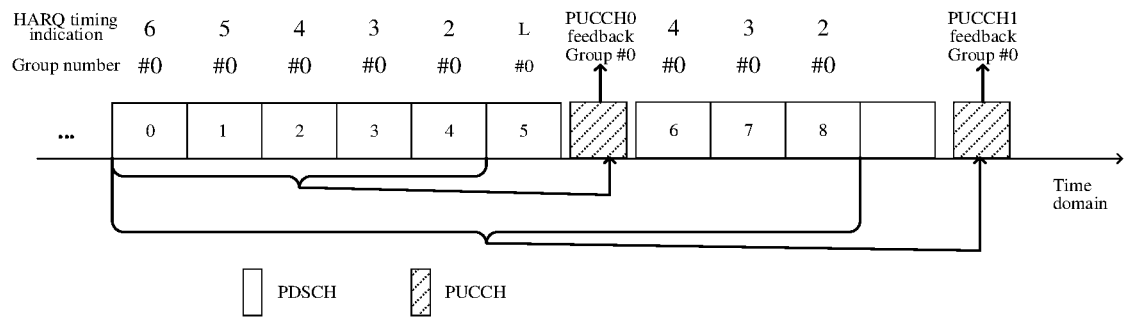
FIG. 5 is another schematic diagram of determining an HARQ codebook according to an implementation of the present disclosure.

Optionally, as the third implementation,

When grouping PDSCHs, the base station divides a PDSCH which cannot determine a feedback resource temporarily and a PDSCH which can feed back normally into one group. The base station indicates a PUCCH resource for the PDSCH which can feed back normally, while it does not indicate a PUCCH resource for a PDSCH which cannot feed back temporarily, but waits for a resource indicated for the subsequent PDSCH scheduling. As shown in FIG. 5, the base station schedules 6 PDSCHs for the terminal device in one downlink burst, which are respectively named PDSCH 0 to PDSCH 5. The 6 PDSCHs belong to a same group, i.e., group #0. A feedback resource indicated by HARQ timing indication information corresponding to PDSCH 0 to PDSCH 4 among the 6 PDSCHs is PUCCH 0. For PDSCH 5, the base station indicates to the terminal device that a feedback resource indicated by the HARQ timing indication information corresponding to PDSCH 5 is temporarily undetermined. After PUCCH 0, the base station still schedules 3 PDSCHs in group #0 for the terminal device, which are named PDSCH 6 to PDSCH 8 respectively, and indicates a valid uplink resource PUCCH 1 for the newly scheduled PDSCH 6 to PDSCH 8.

It should be noted that the terminal device determines that the feedback resource is PUCCH 0 or PUCCH 1 according to the HARQ timing indication information. As shown in FIG. 5, in group #0, the HARQ timing indication information corresponding to PDSCH 0 is 6, that is, a distance between PDSCH 0 and PUCCH 0 in the time domain may be considered as 6 time units, such as 6 time slots. HARQ timing indication information corresponding to PDSCH 1 is 5, that is, a distance between PDSCH 1 and PUCCH 0 in the time domain may be considered as 5 time units, such as 5 time slots. HARQ timing indication information corresponding to PDSCH 2 is 4, that is, a distance between PDSCH 2 and PUCCH 0 in the time domain may be considered as 4 time units, such as 4 time slots. HARQ timing indication information corresponding to PDSCH 3 is 3, that is, a distance between PDSCH 3 and PUCCH 0 in the time domain may be considered as 3 time units, such as 3 time slots. HARQ timing indication information corresponding to PDSCH 4 is 2, that is, a distance between PDSCH 4 and PUCCH 0 in the time domain may be considered as 2 time units, such as 2 time slots. HARQ timing indication information corresponding to PDSCH 5 is L, that is, a feedback resource indicated by the HARQ timing indication information corresponding to PDSCH 5 is temporarily undetermined. HARQ timing indication information corresponding to PDSCH 6 is 4, that is, a distance between PDSCH 6 and PUCCH 1 in the time domain may be considered as 4 time units, such as 4 time slots. HARQ timing indication information corresponding to PDSCH 7 is 3, that is, a distance between PDSCH 7 and PUCCH 1 in the time domain may be considered as 3 time units, such as 3 time slots. HARQ timing indication information corresponding to PDSCH 8 is 2, that is, a distance between PDSCH 8 and PUCCH 1 in the time domain may be considered as 2 time units, such as 2 time slots.

The HARQ codebook corresponding to the PDSCHs in group #0 included in the HARQ codebook transmitted on PUCCH 0 may include at least one of the following cases 8 and 9.

In case 8, for a PDSCH in group #0 whose feedback resource indicated by the HARQ timing indication information is temporarily undetermined, its corresponding HARQ codebook is set as NACK or placeholder information, that is, the HARQ codebook transmitted on PUCCH 0 is as shown in Table 8 below. When preparing the HARQ codebook corresponding to the PDSCHs in group #0 for PUCCH 0, the terminal device determines the size of the HARQ codebook according to the number of PDSCHs included in group #0 before PUCCH 0, which can avoid the misunderstanding and ambiguity between the base station and the terminal device.

TABLE 8

| HARQ codebook corresponding to PUCCH 0 | | | | | |
|---|---|---|---|---|---|
| PDSCH 0 | | PDSCH 1 | | PDSCH 2 | |
| Codeword 0 | Codeword 1 | Codeword 0 | Codeword 1 | Codeword 0 | Codeword 1 |
| PDSCH 3 | | PDSCH 4 | | PDSCH 5 | |
| Codeword 0 | Codeword 1 | Codeword 0 | Codeword 1 | NACK | NACK |

In case 9, for PDSCHs in group #0 whose feedback resource indicated by the HARQ timing indication information is temporarily uncertain, if at least one PDSCH with the feedback resource indicated as PUCCH 0 is included after these PDSCHs and before PUCCH 0, the HARQ codebook corresponding to PUCCH 0 includes the HARQ codebook corresponding to these PDSCHs. If the PDSCH(s) are the last or last consecutive PDSCHs in this burst, the codebook in group #0 does not include the HARQ-ACK codebook corresponding to these PDSCHs, that is, the HARQ codebook transmitted on PUCCH 0 is as shown in Table 9 below.

TABLE 9

| HARQ codebook corresponding to PUCCH 0 | | | | | |
| --- | --- | --- | --- | --- | --- |
| PDSCH 0 | | PDSCH 1 | | PDSCH 2 | |
| Codeword 0 | Codeword 1 | Codeword 0 | Codeword 1 | Codeword 0 | Codeword 1 |
| PDSCH 3 | | PDSCH 4 | | | |
| Codeword 0 | Codeword 1 | Codeword 0 | Codeword 1 | | |

Optionally, as shown in FIG. 5, in the third implementation, after PUCCH 0, the base station still schedules PDSCHs in group #0 for the terminal device, which are named PDSCH 6 to PDSCH 8 respectively, and indicates a valid uplink resource PUCCH 1 for newly scheduled PDSCH 6 to PDSCH 8. The HARQ codebook corresponding to the PDSCHs in group #0 included in the HARQ codebook transmitted on PUCCH 1 may be as shown in Table 10 below. For a PDSCH whose HARQ timing indication information indicates no feedback temporarily, its uplink feedback resource is determined according to a valid uplink feedback resource indicated by another PDSCH in the same group.

TABLE 10

| HARQ codebook corresponding to PUCCH 1 | | | | | |
| --- | --- | --- | --- | --- | --- |
| PDSCH 0 | | PDSCH 1 | | PDSCH 2 | |
| Codeword 0 | Codeword 1 | Codeword 0 | Codeword 1 | Codeword 0 | Codeword 1 |
| PDSCH 3 | | PDSCH 4 | | PDSCH 5 | |
| Codeword 0 | Codeword 1 | Codeword 0 | Codeword 1 | Codeword 0 | Codeword 1 |
| PDSCH 6 | | PDSCH 7 | | PDSCH 8 | |
| Codeword 0 | Codeword 1 | Codeword 0 | Codeword 1 | Codeword 0 | Codeword 1 |

Figure 6:
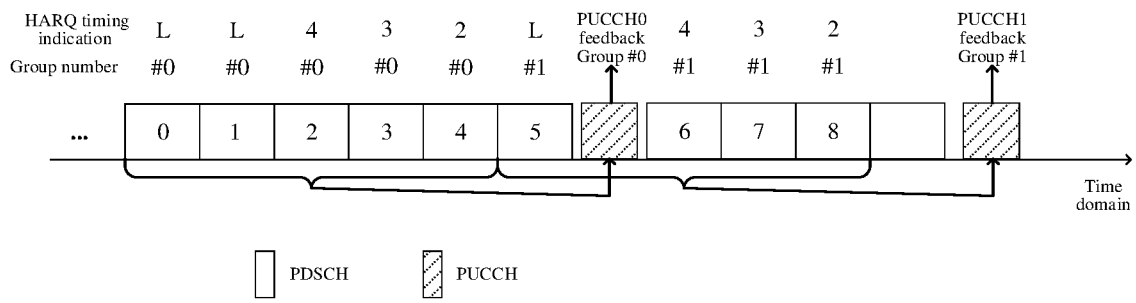
FIG. 6 is another schematic diagram of determining an HARQ codebook according to an implementation of the present disclosure.

Optionally, as the fourth implementation,

When grouping PDSCH, the base station divides a PDSCH which cannot determine a feedback resource temporarily and a PDSCH which can feedback normally in the same burst into different groups. The base station indicates a PUCCH resource for the PDSCH which can feedback normally, while it does not indicate a PUCCH resource for the PDSCH which cannot feedback temporarily, but waits for a resource indicated by the subsequent PDSCH scheduling. As shown in FIG. 6, the base station schedules 6 PDSCHs for the terminal device in one downlink burst, which are respectively named PDSCH 0 to PDSCH 5. Among the 6 PDSCHs, PDSCH 0 to PDSCH 4 belong to a same group, that is, group #0, and a feedback resource indicated by HARQ timing indication information corresponding to PDSCH 0 to PDSCH 4 among the 6 PDSCHs is PUCCH 0. For PDSCH 5 among the 6 PDSCHs, the base station indicates to the terminal device that a feedback resource indicated by the HARQ timing indication information corresponding to PDSCH 5 is temporarily undetermined, and PDSCH 5 belongs to group #1.

It should be noted that the terminal device determines that the feedback resource is PUCCH 0 or PUCCH 1 according to the HARQ timing indication information. As shown in FIG. 6, in group #0, HARQ timing indication information corresponding to PDSCH 0 is L, that is, a feedback resource indicated by the HARQ timing indication information corresponding to PDSCH 0 may be considered as being temporarily undetermined. HARQ timing indication information corresponding to PDSCH 1 is L, that is, a feedback resource indicated by the HARQ timing indication information corresponding to PDSCH 1 may be considered as being temporarily undetermined. HARQ timing indication information corresponding to PDSCH 2 is 4, that is, a distance between PDSCH 2 and PUCCH 0 in the time domain may be considered as 4 time units, such as 4 time slots. HARQ timing indication information corresponding to PDSCH 3 is 3, that is, a distance between PDSCH 3 and PUCCH 0 in the time domain may be considered as 3 time units, such as 3 time slots. HARQ timing indication information corresponding to PDSCH 4 is 2, that is, a distance between PDSCH 4 and PUCCH 0 in the time domain may be considered as 2 time units, such as 2 time slots. In group #1, HARQ timing indication information corresponding to PDSCH 5 is L, that is, a feedback resource indicated by the HARQ timing indication information corresponding to PDSCH 5 may be considered as being temporarily undetermined. HARQ timing indication information corresponding to PDSCH 6 is 4, that is, a distance between PDSCH 6 and PUCCH 1 in the time domain may be considered as 4 time units, such as 4 time slots or symbols. HARQ timing indication information corresponding to PDSCH 7 is 3, that is, a distance between PDSCH 7 and PUCCH 1 in the time domain may be considered as 3 time units, such as 3 time slots or symbols. HARQ timing indication information corresponding to PDSCH 8 is 2, that is, a distance between PDSCH 8 and PUCCH 1 in the time domain may be considered as 2 time units, such as 2 time slots.

The HARQ information corresponding to the PDSCHs in group #0 included in the HARQ codebook transmitted on PUCCH 0 may include at least one of the following cases 10 and 11.

In case 10, for a PDSCH in group #0 whose feedback resource indicated by the HARQ timing indication information is temporarily undetermined, its corresponding HARQ codebook is set as NACK or placeholder information, that is, the HARQ codebook transmitted on PUCCH 0 is as shown in Table 11 below. When preparing the HARQ codebook corresponding to the PDSCHs in group #0 for PUCCH 0, the terminal device determines the size of the HARQ codebook according to the number of PDSCHs included in group #0 before PUCCH 0, which can avoid the misunderstanding and ambiguity between the base station and the terminal device.

TABLE 11

| HARQ codebook corresponding to PUCCH 0 | | | | | |
|---|---|---|---|---|---|
| PDSCH 0 | | PDSCH 1 | | PDSCH 2 | |
| NACK | NACK | NACK | NACK | Codeword 0 | Codeword 1 |
| PDSCH 3 | | | PDSCH 4 | | |
| Codeword 0 | Codeword 1 | | Codeword 0 | Codeword 1 | |

In case 11, for PDSCHs in group #0 whose feedback resource indicated by the HARQ timing indication information is temporarily undetermined, if at least one PDSCH with the feedback resource indicated as PUCCH 0 is included after these PDSCHs and before PUCCH 0, the HARQ codebook corresponding to PUCCH 0 includes the HARQ-ACK codebook corresponding to these PDSCHs. If the PDSCH(s) are the last or last consecutive PDSCHs in this burst, the HARQ-ACK codebook corresponding to these PDSCHs is set as NACK or placeholder information, that is, the HARQ codebook transmitted on PUCCH 0 is as shown in Table 12 below. In case 11, for a PDSCH whose HARQ timing indication information indicates no feedback temporarily, its uplink feedback resource may be determined according to a valid uplink feedback resource indicated by another PDSCH in the same group.

Optionally, as shown in FIG. 6, in the fourth implementation, after PUCCH 0, the base station continues to schedule PDSCHs in group #1 for the terminal device, which are named PDSCH 6 to PDSCH 8 respectively, and indicates a valid uplink resource PUCCH 1 for the PDSCHs in group #1.

The HARQ codebook corresponding to the PDSCHs in group #1 included in the HARQ codebook transmitted on PUCCH 1 may include at least one of the following cases 12 and 13.

In case 12, for a PDSCH in group #1 whose feedback resource indicated by the HARQ timing indication information is temporarily undetermined, its corresponding HARQ codebook is set as NACK or placeholder information, that is, the HARQ codebook transmitted on PUCCH 1 is as shown in Table 13 below. When preparing the HARQ codebook corresponding to the PDSCHs in group #1 for PUCCH 1, the terminal device determines the size of the HARQ codebook according to the number of PDSCHs included in group #1 before PUCCH 1, which can avoid the misunderstanding and ambiguity between the base station and the terminal device.

TABLE 13

| HARQ codebook corresponding to PUCCH 1 | | | | | | | |
|---|---|---|---|---|---|---|---|
| PDSCH 5 | | PDSCH 6 | | PDSCH 7 | | PDSCH 8 | |
| NACK | NACK | Codeword 0 | Codeword 0 | Codeword 1 | Codeword 1 | Codeword 0 | Codeword 1 |

TABLE 12

| HARQ codebook corresponding to PUCCH 0 | | | | | |
|---|---|---|---|---|---|
| PDSCH 0 | | PDSCH 1 | | PDSCH 2 | |
| Codeword 0 | Codeword 1 | Codeword 0 | Codeword 1 | Codeword 0 | Codeword 1 |
| PDSCH 3 | | | PDSCH 4 | | |
| Codeword 0 | Codeword 1 | | Codeword 0 | Codeword 1 | |

In case 13, for PDSCHs in group #1 whose feedback resource indicated by the HARQ timing indication information is temporarily undetermined, if at least one PDSCH with the feedback resource indicated as PUCCH 1 is included after these PDSCHs and before PUCCH 1, the HARQ codebook corresponding to PUCCH 1 includes the HARQ-ACK codebook corresponding to these PDSCHs. If the PDSCH(s) are the last or last consecutive PDSCHs in this burst, the HARQ-ACK codebook corresponding to these PDSCHs is set as NACK or placeholder information, that is, the HARQ codebook transmitted on PUCCH 1 is as shown in Table 14 below. In case 13, for a PDSCH whose HARQ timing indication information indicates no feedback temporarily, its uplink feedback resource is determined according to a valid uplink feedback resource indicated by another PDSCH in the same group.

TABLE 14

| HARQ codebook corresponding to PUCCH 1 | | | | | | | |
|---|---|---|---|---|---|---|---|
| PDSCH 5 | | PDSCH 6 | | PDSCH 7 | | PDSCH 8 | |
| Codeword 0 | Codeword 1 | Codeword 0 | Codeword 0 | Codeword 1 | Codeword 1 | Codeword 0 | Codeword 1 |

Therefore, in the implementation of the present disclosure, the terminal device determines that the HARQ timing indication information corresponding to the first channel in the first channel group indicates the first uplink resource, and determines, for the first uplink resource, the first HARQ codebook corresponding to the first channel group, so that the terminal device may determine the HARQ codebook of the channel group when the HARQ timing indication information corresponding to the channels included in the same channel group corresponds to different uplink resources.

Figure 7:
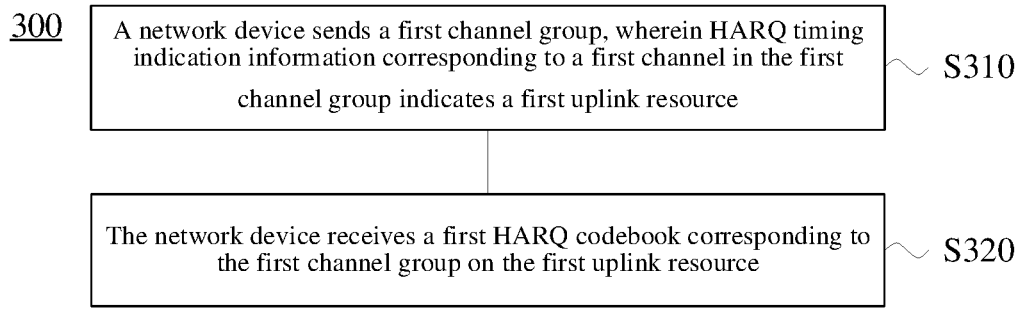
FIG. 7 is a schematic flowchart of a method for receiving an HARQ codebook according to an implementation of the present disclosure.

FIG. 7 is a schematic flowchart of a method 300 for receiving an HARQ codebook according to an implementation of the present disclosure. As shown in FIG. 7, the method 300 may include part or all of the following acts:

In S310, a network device sends a first channel group, wherein HARQ timing indication information corresponding to a first channel in the first channel group indicates a first uplink resource; and In S320, the network device receives a first HARQ codebook corresponding to the first channel group on the first uplink resource.

Optionally, in an implementation of the present disclosure, a size of the first HARQ codebook is determined according to the number of channels in the first channel group.

Optionally, in an implementation of the present disclosure, the first HARQ codebook includes an HARQ codebook corresponding to the channels in the first channel group, and/or the first HARQ codebook includes an HARQ codebook corresponding to a channel of the first uplink resource indicated by the corresponding HARQ timing indication information in the first channel group.

Optionally, in an implementation of the present disclosure, HARQ timing indication information corresponding to a second channel in the first channel group indicates no feedback temporarily, and the second channel is no later than the first channel in the time domain, then the first HARQ codebook includes a HARQ codebook corresponding to the second channel.

Optionally, in an implementation of the present disclosure, the HARQ timing indication information corresponding to a third channel in the first channel group indicates no feedback temporarily, and the third channel is later than the first channel in the time domain, then the first HARQ codebook includes one of the following cases:

a HARQ codebook corresponding to the third channel in the first HARQ codebook is set as negative acknowledgement NACK or placeholder information; and the first HARQ codebook does not include the HARQ codebook corresponding to the third channel.

Optionally, in an implementation of the present disclosure, when HARQ timing indication information corresponding to a fourth channel in the first channel group indicates a second uplink resource, the network device receives a second HARQ codebook corresponding to the first channel group on the second uplink resource.

Optionally, in an implementation of the present disclosure, the second HARQ codebook includes a HARQ codebook corresponding to a channel of the second uplink resource indicated by the corresponding HARQ timing indication information in the first channel group.

Optionally, in an implementation of the present disclosure, the second HARQ codebook includes at least one of the following cases:

the second HARQ codebook includes a HARQ codebook corresponding to the first channel; and the HARQ codebook corresponding to the first channel in the second HARQ codebook is set as NACK or placeholder information.

Optionally, in an implementation of the application, if the second uplink resource is no later than the first uplink resource in the time domain, the HARQ codebook corresponding to the first channel in the second HARQ codebook is set as NACK or placeholder information; and/or, if the second uplink resource is later than the first uplink resource in the time domain, the second HARQ codebook includes the HARQ codebook corresponding to the first channel.

Optionally, in an implementation of the present disclosure, HARQ timing indication information corresponding to a second channel in the first channel group indicates no feedback temporarily, the second channel is no later than a fourth channel in the time domain, and the second HARQ codebook includes a HARQ codebook corresponding to the second channel.

Optionally, in an implementation of the present disclosure, HARQ timing indication information corresponding to a third channel in the first channel group indicates no feedback temporarily, the third channel is later than the fourth channel in the time domain, and the second HARQ codebook includes one of the following cases:

an HARQ codebook corresponding to the third channel in the second HARQ codebook is set as NACK or placeholder information; and the second HARQ codebook does not include the HARQ codebook corresponding to the third channel.

Optionally, in an implementation of the present disclosure, when HARQ timing indication information corresponding to the fourth channel in the first channel group indicates the second uplink resource, the network device ignores receiving the HARQ codebook corresponding to the first channel group on the second uplink resource, wherein the fourth channel is no later than the first channel in the time domain, or the fourth channel is later than the first channel in the time domain.

Optionally, in an implementation of the present disclosure, the first HARQ codebook includes a HARQ codebook corresponding to the fourth channel.

Optionally, in an implementation of the present disclosure, the first channel is a channel being indicated the first uplink resource at the latest in the first channel group.

It should be understood that for the acts and descriptions in the method 300 for receiving an HARQ codebook, reference may be made to the corresponding acts and descriptions in the method 200 for determining an HARQ codebook, which will not be repeated here for the sake of brevity.

Therefore, in an implementation of the present disclosure, the HARQ timing indication information corresponding to the first channel in the first channel group indicates the first uplink resource, and the network device receives the first HARQ codebook corresponding to the first channel group on the first uplink resource, so that the network device may receive the HARQ codebook of the channel group when the HARQ timing indication information corresponding to the channels included in the same channel group corresponds to different uplink resources.

Figure 8:
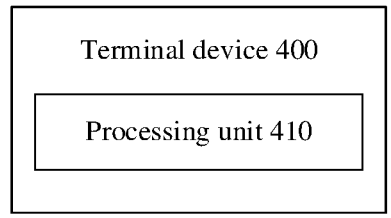
FIG. 8 is a schematic block diagram of a terminal device according to an implementation of the present disclosure.

FIG. 8 is a schematic block diagram of a terminal device 400 according to an implementation of the present disclosure. As shown in FIG. 8, the terminal device 400 includes:

a processing unit 410 configured to determine a first channel group, wherein HARQ timing indication information corresponding to a first channel in the first channel group indicates a first uplink resource; and the processing unit 410 is further configured to determine a first HARQ codebook corresponding to the first channel group for the first uplink resource.

Optionally, the size of the first HARQ codebook is determined according to the number of channels in the first channel group.

Optionally, the first HARQ codebook includes an HARQ codebook corresponding to a channel in the first channel group, and/or the first HARQ codebook includes an HARQ codebook corresponding to a channel of the first uplink resource indicated by the corresponding HARQ timing indication information in the first channel group.

Optionally, HARQ timing indication information corresponding to a second channel in the first channel group indicates no feedback temporarily, wherein the second channel is no later than the first channel in the time domain, and the first HARQ codebook includes a HARQ codebook corresponding to the second channel.

Optionally, HARQ timing indication information corresponding to a third channel in the first channel group indicates no feedback temporarily, wherein the third channel is later than the first channel in the time domain, and the first HARQ codebook includes one of the following cases:

a HARQ codebook corresponding to the third channel in the first HARQ codebook is set as negative acknowledgement NACK or placeholder information; and the first HARQ codebook does not include the HARQ codebook corresponding to the third channel.

Optionally, HARQ timing indication information corresponding to a fourth channel in the first channel group indicates a second uplink resource, and the processing unit 410 is further configured to determine a second HARQ codebook corresponding to the first channel group for the second uplink resource.

Optionally, the second HARQ codebook includes a HARQ codebook corresponding to a channel of the second uplink resource indicated by the corresponding HARQ timing indication information in the first channel group.

Optionally, the second HARQ codebook includes one of the following cases:

the second HARQ codebook includes a HARQ codebook corresponding to the first channel; and the HARQ codebook corresponding to the first channel in the second HARQ codebook is set as NACK or placeholder information.

Optionally, if the second uplink resource is no later than the first uplink resource in the time domain, the HARQ codebook corresponding to the first channel in the second HARQ codebook is set as NACK or placeholder information; and/or, if the second uplink resource is later than the first uplink resource in the time domain, the second HARQ codebook includes the HARQ codebook corresponding to the first channel.

Optionally, the HARQ timing indication information corresponding to the second channel in the first channel group indicates no feedback temporarily, wherein the second channel is no later than the fourth channel in the time domain, and the second HARQ codebook includes the HARQ codebook corresponding to the second channel.

Optionally, the HARQ timing indication information corresponding to the third channel in the first channel group indicates no feedback temporarily, wherein the third channel is later than the fourth channel in the time domain, and the second HARQ codebook includes one of the following cases:

a HARQ codebook corresponding to the third channel in the second HARQ codebook is set as NACK or placeholder information; and the second HARQ codebook does not include the HARQ codebook corresponding to the third channel.

Optionally, the HARQ timing indication information corresponding to the fourth channel in the first channel group indicates the second uplink resource, and the processing unit 410 is further configured to ignore determining the HARQ codebook corresponding to the first channel group for the second uplink resource, wherein the fourth channel is no later than the first channel in the time domain, or the fourth channel is later than the first channel in the time domain.

Optionally, the first HARQ codebook includes a HARQ codebook corresponding to the fourth channel.

Optionally, the first channel is a channel being indicated the first uplink resource at the latest in the first channel group.

It should be understood that the terminal device 400 according to an implementation of the present disclosure may correspond to the terminal device in the method implementations of the present disclosure, and the above-mentioned and other operations and/or functions of units in the terminal device 400 are respectively for implementing the corresponding processes of the terminal device in the method 200 as shown in FIG. 2, which will not be repeated here for brevity.

Figure 9:
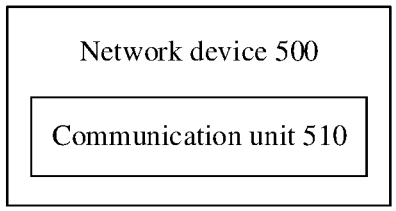
FIG. 9 is a schematic block diagram of a network device according to an implementation of the present disclosure.

FIG. 9 shows a schematic block diagram of a network device 500 according to an implementation of the present disclosure. As shown in FIG. 9, the network device 500 includes:

a communication unit 510 configured to send a first channel group, wherein HARQ timing indication information corresponding to a first channel in the first channel group indicates a first uplink resource; and the communication unit 510 is further configured to receive a first HARQ codebook corresponding to the first channel group on the first uplink resource.

Optionally, the size of the first HARQ codebook is determined according to the number of channels in the first channel group.

Optionally, the first HARQ codebook includes an HARQ codebook corresponding to a channel in the first channel group, and/or the first HARQ codebook includes an HARQ codebook corresponding to a channel of the first uplink resource indicated by the corresponding HARQ timing indication information in the first channel group.

Optionally, HARQ timing indication information corresponding to a second channel in the first channel group indicates no feedback temporarily, wherein the second channel is no later than the first channel in the time domain, and the first HARQ codebook includes a HARQ codebook corresponding to the second channel.

Optionally, HARQ timing indication information corresponding to a third channel in the first channel group indicates no feedback temporarily, wherein the third channel is later than the first channel in the time domain, and the first HARQ codebook includes one of the following cases:

an HARQ codebook corresponding to the third channel in the first HARQ codebook is set as negative acknowledgement NACK or placeholder information; and the first HARQ codebook does not include the HARQ codebook corresponding to the third channel.

Optionally, HARQ timing indication information corresponding to a fourth channel in the first channel group indicates a second uplink resource, and the communication unit 510 is further configured to receive a second HARQ codebook corresponding to the first channel group on the second uplink resource.

Optionally, the second HARQ codebook includes a HARQ codebook corresponding to a channel of the second uplink resource indicated by the corresponding HARQ timing indication information in the first channel group.

Optionally, the second HARQ codebook includes one of the following cases:
- the second HARQ codebook includes a HARQ codebook corresponding to the first channel; and
- the HARQ codebook corresponding to the first channel in the second HARQ codebook is set as NACK or placeholder information.

Optionally, if the second uplink resource is no later than the first uplink resource in the time domain, the HARQ codebook corresponding to the first channel in the second HARQ codebook is set as NACK or placeholder information; and/or,
- if the second uplink resource is later than the first uplink resource in the time domain, the second HARQ codebook includes the HARQ codebook corresponding to the first channel.

Optionally, the HARQ timing indication information corresponding to the second channel in the first channel group indicates no feedback temporarily, wherein the second channel is no later than the fourth channel in the time domain, and the second HARQ codebook includes a HARQ codebook corresponding to the second channel.

Optionally, the HARQ timing indication information corresponding to the third channel in the first channel group indicates no feedback temporarily, wherein the third channel is later than the fourth channel in the time domain, and the second HARQ codebook includes one of the following cases:
- an HARQ codebook corresponding to the third channel in the second HARQ codebook is set as NACK or placeholder information; and
- the second HARQ codebook does not include the HARQ codebook corresponding to the third channel.

Optionally, the HARQ timing indication information corresponding to the fourth channel in the first channel group indicates the second uplink resource, and the communication unit 510 is further configured to ignore receiving the HARQ codebook corresponding to the first channel group on the second uplink resource, wherein the fourth channel is no later than the first channel in the time domain, or the fourth channel is later than the first channel in the time domain.

Optionally, the first HARQ codebook includes an HARQ codebook corresponding to the fourth channel.

Optionally, the first channel is a channel being indicated the first uplink resource at the latest in the first channel group.

It should be understood that the network device 500 according to the implementation of the present disclosure may correspond to the network device in the method implementations of the present disclosure. The above and other operations and/or functions of units in the network device 500 are respectively for implementing the corresponding process of the network device in the method 300 shown in FIG. 7, which will not be repeated here for brevity.

Figure 10:
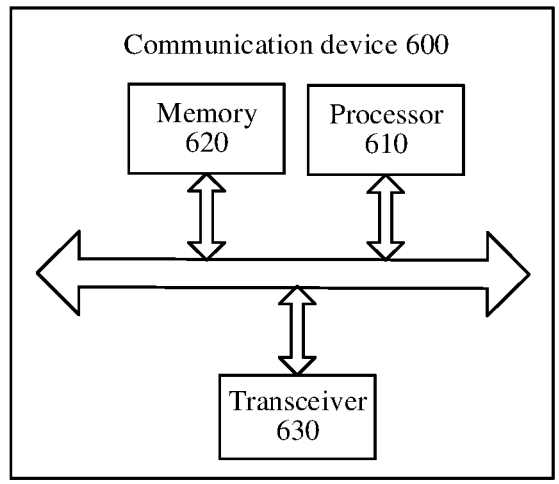
FIG. 10 is a schematic block diagram of a communication device according to an implementation of the present disclosure.

FIG. 10 is a schematic diagram of a structure of a communication device 600 according to an implementation of the present disclosure. The communication device 600 shown in FIG. 10 includes a processor 610, which may call and run a computer program from a memory to implement the methods in the implementations of the present disclosure.

Optionally, as shown in FIG. 10, the communication device 600 may further include a memory 620. The processor 610 may call and run a computer program from the memory 620 to implement the methods in the implementations of the present disclosure.

The memory 620 may be a separate device independent of the processor 610 or may be integrated in the processor 610.

Optionally, as shown in FIG. 10, the communication device 600 may further include a transceiver 630, and the processor 610 may control the transceiver 630 to communicate with another device. Specifically, the transceiver 630 may send information or data to another device or receive information or data sent by another device.

The transceiver 630 may include a transmitter and a receiver. The transceiver 630 may further include antennas, and the number of the antennas may be one or more.

Optionally, the communication device 600 may specifically be a network device or a base station of an implementation of the present disclosure, and the communication device 600 may implement the corresponding processes implemented by the network device or base station in various methods of the implementations of the present disclosure, which will not be repeated here for brevity.

Optionally, the communication device 600 may specifically be a mobile terminal/terminal device of an implementation of the present disclosure, and the communication device 600 may implement the corresponding processes implemented by the mobile terminal/terminal device in various methods of the implementations of the present disclosure, which will not be repeated here for brevity.

Figure 11:
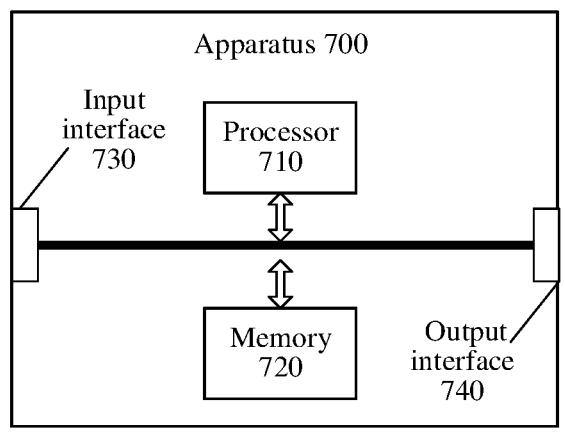
FIG. 11 is a schematic block diagram of an apparatus according to an implementation of the present disclosure.

FIG. 11 is a schematic diagram of a structure of an apparatus according to an implementation of the present disclosure. The apparatus 700 shown in FIG. 11 includes a processor 710. The processor 710 may call and run a computer program from a memory to implement the methods in the implementations of the present disclosure.

Optionally, as shown in FIG. 11, the device 700 may further include a memory 720. The processor 710 may call and run the computer program from the memory 720 to implement the methods in the implementations of the present disclosure.

The memory 720 may be a separate device independent of the processor 710 or may be integrated in the processor 710.

Optionally, the device 700 may further include an input interface 730. The processor 710 may control the input interface 730 to communicate with another device or chip. Specifically, the processor 710 may acquire information or data sent by another device or chip.

Optionally, the device 700 may further include an output interface 740. The processor 710 may control the output interface 740 to communicate with another device or chip. Specifically, the processor 710 may output information or data to another device or chip.

Optionally, the apparatus may be applied to a network device or base station in an implementation of the present disclosure, and the apparatus may implement the corresponding processes implemented by the network device or base station in various methods of the implementations of the present disclosure, which will not be repeated here for brevity.

Optionally, the apparatus may be applied to a mobile terminal/terminal device in an implementation of the present disclosure, and the apparatus may implement the corresponding processes implemented by the mobile terminal/terminal device in various methods of the implementations of the present disclosure, which will not be repeated here for brevity.

Optionally, the apparatus mentioned in the implementations of the present disclosure may also be a chip. For example, it may be a system level chip, a system chip, a system-on-chip or a system chip on a chip.

Figure 12:
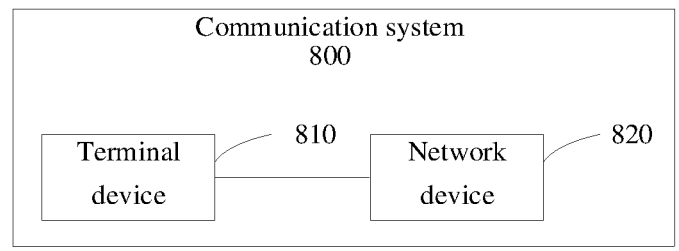
FIG. 12 is a schematic block diagram of a communication system according to an implementation of the present disclosure.

FIG. 12 is a schematic block diagram of a communication system 800 according to an implementation of the present disclosure. As shown in FIG. 12, the communication system 800 includes a terminal device 810 and a network device 820.

The terminal device 810 may be configured to implement the corresponding functions implemented by the terminal device in the above methods, and the network device 820 may be configured to implement the corresponding functions implemented by the network device or base station in the above methods, which will not be repeated here for brevity.

It should be understood that the processor in the implementations of the present disclosure may be an integrated circuit chip having a signal processing capability. In an implementation process, each of the acts of the above method implementations may be completed through an integrated logic circuit of hardware in the processor or instructions in a form of software. The processor described above may be a general purpose processor, a Digital Signal Processor (DSP), an Application Specific Integrated Circuit (ASIC), a Field Programmable Gate Array (FPGA) or other programmable logic devices, a discrete gate or a transistor logic device, or a discrete hardware component. The processor may implement or perform various methods, acts and logical block diagrams disclosed in the implementations of the present disclosure. The general purpose processor may be a microprocessor, or the processor may also be any conventional processor, or the like. The acts of the methods disclosed in the implementations of the present disclosure may be directly implemented by a hardware decoding processor, or may be implemented by a combination of hardware and software modules in the decoding processor. The software modules may be located in a storage medium which is mature in the art, such as a random access memory, a flash memory, a read-only memory, a programmable read-only memory, an electrically erasable programmable memory, a register, etc. The storage medium is located in the memory, and the processor reads information in the memory and completes the acts of the above methods in combination with its hardware.

It may be understood that the memory in the implementations of the present disclosure may be a volatile memory or a non-volatile memory, or may include both a volatile memory and a non-volatile memory. The non-volatile memory may be a Read-Only Memory (ROM), a programmable read-only memory (PROM), an erasable programmable read-only memory (EPROM), an electrically erasable programmable read-only memory (EEPROM), or a flash memory. The volatile memory may be a random access memory (RAM), which is used as an external cache. Through exemplary but non-restrictive description, many forms of RAMs may be available, such as a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchronous link dynamic random access memory (SLDRAM), and a direct Rambus dynamic random access memory (DR RAM). It should be noted that the memory in the systems and methods described herein is intended to include, but is not limited to, these and any other suitable types of memories.

It should be understood that the above memories are described in an exemplary but non-limiting sense. For example, a memory in an implementation of the present disclosure may also be a static RAM (SRAM), a dynamic RAM (DRAM), a synchronous DRAM (SDRAM), a double Data Rate SDRAM (DDR SDRAM), an enhanced SDRAM (ESDRAM), a synch link DRAM (SLDRAM), a direct Rambus RAM (DR RAM), or the like. That is, the memories in the implementations of the present disclosure are intended to include, but not be limited to, these and any other suitable type of memory.

An implementation of the present disclosure further provides a computer-readable storage medium configured to store a computer program.

Optionally, the computer readable storage medium may be applied to a network device or base station in an implementation of the present disclosure, and the computer program enables a computer to perform the corresponding processes implemented by the network device or base station in various methods of the implementations of the present disclosure, which will not be repeated here for brevity.

Optionally, the computer readable storage medium may be applied to a mobile terminal/terminal device in an implementation of the present disclosure, and the computer program enables a computer to perform the corresponding processes implemented by the mobile terminal/terminal device in various methods of the implementations of the present disclosure, which will not be repeated here for brevity.

An implementation of the present disclosure further provides a computer program product including computer program instructions.

Optionally, the computer program product may be applied to a network device or base station in an implementation of the present disclosure, and the computer program instructions enable a computer to perform the corresponding processes implemented by the network device or base station in various methods of the implementations of the present disclosure, which will not be repeated here for brevity.

Optionally, the computer program product may be applied to a mobile terminal/terminal device in an implementation of the present disclosure, and the computer program instructions enable a computer to perform the corresponding processes implemented by the mobile terminal/terminal device in various methods of the implementations of the present disclosure, which will not be repeated here for brevity.

An implementation of the present disclosure further provides a computer program.

Optionally, the computer program may be applied to a network device or base station in an implementation of the present disclosure, and when the computer program is run on a computer, the computer is enabled to perform the corresponding processes implemented by the network device or base station in various methods of the implementations of the present disclosure, which will not be repeated here for brevity.

Optionally, the computer program may be applied to a mobile terminal/terminal device in an implementation of the present disclosure. When the computer program is run on a computer, the computer is enabled to perform the corresponding processes implemented by the mobile terminal/terminal device in various methods of the implementations of the present disclosure, which will not be repeated here for brevity.

Those of ordinary skill in the art will recognize that the exemplary elements and algorithm acts described in combination with the implementations disclosed herein may be implemented in form of electronic hardware, or a combination of computer software and electronic hardware. Whether these functions are implemented in form of hardware or software depends on the specific application and design constraints of the technical solution. Those skilled in the art may use different methods to implement the described functions for each particular application, but such implementation should not be considered to be beyond the scope of the present disclosure.

Those skilled in the art may clearly understand that for the sake of convenience and conciseness of description, the specific working processes of the systems, devices and units described above may be described with reference to the corresponding processes in the above method implementations and will not be repeated herein.

In several implementations provided by the present invention, it should be understood that the disclosed systems, devices and methods may be implemented in other ways. For example, the device implementations described above are only illustrative, for example, the division of the units is only a logical function division, and there may be other division manners in actual implementation. For example, multiple units or components may be combined or integrated into another system, or some features may be ignored or not executed. On the other hand, the mutual coupling or direct coupling or communication connection shown or discussed may be indirect coupling or communication connection through some interfaces, apparatuses or units, or may be in electrical, mechanical or in other forms.

A unit described as a separate component may or may not be physically separated, and the component shown as a unit may or may not be a physical unit, i.e., it may be located in one place or may be distributed across multiple network units. Part or all of the units may be selected according to actual needs to achieve the purpose of the implementations.

In addition, various functional units in various implementations of the present disclosure may be integrated into one processing unit, or may exist physically separately, or two or more than two units may be integrated into one unit.

The function, if achieved in a form of software functional units and sold or used as a separate product, may be stored in a computer-readable storage medium. Regarding such understanding, the technical solution of the present disclosure, in essence, or the part contributing to the prior art, or a part of the technical solution, may be embodied in a form of a software product, wherein the computer software product is stored in a storage medium, and includes a number of instructions for enabling a computer device (which may be a personal computer, a server, or a network device, or the like) to perform all or part of the acts of the methods described in various implementations of the present disclosure. The aforementioned storage medium includes various media that can store program code, such as a USB flash drive, a removable hard disk, a read-only memory (ROM), a random access memory (RAM), a magnetic disk, or an optical disk.

What are described above are merely specific implementation modes of the present disclosure, but the protection scope of the present disclosure is not limited thereto. Any variation or substitution that may be easily conceived by a person familiar with the art within the technical scope disclosed by the present disclosure shall be included within the protection scope of the present disclosure. Therefore, the protection scope of the present disclosure shall be subject to the protection scope of the claims.

What is claimed is:

1. A method for determining a hybrid automatic repeat request (HARQ) codebook, comprising:
   determining, by a terminal device, a first channel group, wherein HARQ timing indication information corresponding to a first channel in the first channel group indicates a first uplink resource; and
   determining, by the terminal device a first HARQ codebook corresponding to the first channel group for the first uplink resource;
   wherein HARQ timing indication information corresponding to a second channel in the first channel group indicates no feedback temporarily, the second channel is no later than the first channel in time domain, and the first HARQ codebook comprises an HARQ codebook corresponding to the second channel.

2. The method of claim 1, wherein a size of the first HARQ codebook is determined according to a number of channels in the first channel group.

3. The method of claim 1, wherein the first HARQ codebook comprises an HARQ codebook corresponding to a channel in the first channel group.

4. The method of claim 1, wherein HARQ timing indication information corresponding to a fourth channel in the first channel group indicates a second uplink resource, and the method further comprises:
   determining, by the terminal device, a second HARQ codebook corresponding to the first channel group for the second uplink resource.

5. The method of claim 4, wherein the second HARQ codebook comprises:
   the second HARQ codebook comprises a HARQ codebook corresponding to the first channel.

6. The method of claim 5, wherein
   if the second uplink resource is no later than the first uplink resource in the time domain, the HARQ codebook corresponding to the first channel in the second HARQ codebook is set as NACK; or,
   if the second uplink resource is later than the first uplink resource in the time domain, the second HARQ codebook comprises the HARQ codebook corresponding to the first channel.

7. The method of claim 5, wherein
   if the second uplink resource is no later than the first uplink resource in the time domain, the HARQ codebook corresponding to the first channel in the second HARQ codebook is set as NACK; and,
   if the second uplink resource is later than the first uplink resource in the time domain, the second HARQ codebook comprises the HARQ codebook corresponding to the first channel.

8. The method of claim 1, wherein the first channel is a latest channel of channels, corresponding to which HARQ timing indication information indicates the first uplink resource, in the first channel group.

9. A terminal device, comprising: a processor, a memory and a transceiver, wherein the memory is configured to store a computer program, the transceiver is configured to communicate with another device under control of the processor, and the processor is configured to call and run the computer program stored in the memory to:

determine a first channel group, wherein hybrid automatic repeat request (HARQ) timing indication information corresponding to a first channel in the first channel group indicates a first uplink resource; and determine, for the first uplink resource, a first HARQ codebook corresponding to the first channel group;

wherein HARQ timing indication information corresponding to a second channel in the first channel group indicates no feedback temporarily, the second channel is no later than the first channel in time domain, and the first HARQ codebook comprises an HARQ codebook corresponding to the second channel.

10. The terminal device of claim 9, wherein a size of the first HARQ codebook is determined according to a number of channels in the first channel group.

11. The terminal device of claim 9, wherein the first HARQ codebook comprises an HARQ codebook corresponding to a channel in the first channel group.

12. A network device, comprising: a processor, a memory and a transceiver, wherein the memory is configured to store a computer program, the transceiver is configured to communicate with another device under control of the processor, and the processor is configured to call and run the computer program stored in the memory to:

send a first channel group, wherein hybrid automatic repeat request (HARQ) timing indication information corresponding to a first channel in the first channel group indicates a first uplink resource; and receive a first HARQ codebook corresponding to the first channel group on the first uplink resource;

wherein HARQ timing indication information corresponding to a second channel in the first channel group indicates no feedback temporarily, the second channel is no later than the first channel in time domain, and the first HARQ codebook comprises an HARQ codebook corresponding to the second channel.

13. The network device of claim 12, wherein a size of the first HARQ codebook is determined according to a number of channels in the first channel group.

14. The network device of claim 12, wherein the first HARQ codebook comprises an HARQ codebook corresponding to a channel in the first channel group.

15. The network device of claim 12, wherein HARQ timing indication information corresponding to the fourth channel in the first channel group indicates a second uplink resource, and the communication unit is further configured to receive a second HARQ codebook corresponding to the first channel group on the second uplink resource.

16. The network device of claim 15, wherein the second HARQ codebook comprises:

the second HARQ codebook comprises an HARQ codebook corresponding to the first channel.

17. The network device of claim 16, wherein if the second uplink resource is no later than the first uplink resource in the time domain, the HARQ codebook corresponding to the first channel in the second HARQ codebook is set as NACK; or, if the second uplink resource is later than the first uplink resource in the time domain, the second HARQ codebook comprises the HARQ codebook corresponding to the first channel.

18. The network device of claim 16, wherein if the second uplink resource is no later than the first uplink resource in the time domain, the HARQ codebook corresponding to the first channel in the second HARQ codebook is set as NACK; and, if the second uplink resource is later than the first uplink resource in the time domain, the second HARQ codebook comprises the HARQ codebook corresponding to the first channel.

19. The network device of claim 12, wherein the first channel is a latest channel of channels, corresponding to which HARQ timing indication information indicates the first uplink resource, in the first channel group.

* * * * *